United States Patent
Chang et al.

(10) Patent No.: US 12,431,800 B2
(45) Date of Patent: Sep. 30, 2025

(54) SWITCHED-MODE POWER MODULE, A CONTROL CIRCUITRY FOR VOLTAGE AND CURRENT REGULATIONS

(71) Applicant: ZERO-ERROR SYSTEMS PTE. LTD., Singapore (SG)

(72) Inventors: Joseph Sylvester Chang, Singapore (SG); Wei Shu, Singapore (SG); Kwen Siong Chong, Singapore (SG); Arunjai Mittal, Singapore (SG)

(73) Assignee: ZERO-ERROR SYSTEMS PTE. LTD., Singapore (SG)

( * ) Notice: Subject to any disclaimer, the term of this patent is extended or adjusted under 35 U.S.C. 154(b) by 262 days.

(21) Appl. No.: 17/767,010

(22) PCT Filed: Oct. 7, 2020

(86) PCT No.: PCT/SG2020/050569
§ 371 (c)(1),
(2) Date: Apr. 6, 2022

(87) PCT Pub. No.: WO2021/071427
PCT Pub. Date: Apr. 15, 2021

(65) Prior Publication Data
US 2022/0368220 A1  Nov. 17, 2022

(30) Foreign Application Priority Data

Oct. 8, 2019  (SG) ............................ 10201909398W
Aug. 12, 2020  (SG) ............................ 10202007684T

(51) Int. Cl.
*H02M 3/158*  (2006.01)
*H02M 1/00*  (2007.01)

(52) U.S. Cl.
CPC ......... *H02M 3/158* (2013.01); *H02M 1/0035* (2021.05); *H02M 1/0058* (2021.05)

(58) Field of Classification Search
CPC .. H02M 3/158; H02M 3/1582; H02M 3/1584; H02M 3/1588; H02M 1/0035; H02M 1/0032
See application file for complete search history.

(56) References Cited

U.S. PATENT DOCUMENTS 6,724,174 B1 *  4/2004  Esteves .................. H02M 3/155
                                                    323/224
10,720,838 B1 *  7/2020  Harshey .............. H02M 1/0061
(Continued)

FOREIGN PATENT DOCUMENTS

WO    2021071427 A1    4/2021

OTHER PUBLICATIONS

Foreign Communication from a Related Counterpart Application, International Preliminary Report on Patentability dated Apr. 21, 2022, International Application No. PCT/SG2020/050569 filed on Oct. 7, 2020.

(Continued)

*Primary Examiner* — Gustavo A Rosario-Benitez
(74) *Attorney, Agent, or Firm* — Conley Rose, P.C.

(57) ABSTRACT

A control circuitry of a switched-mode power module, the switched-mode power module comprising a power stage configured to receive input power from a power supply and to output power to a load, the output power having an output voltage, the control circuitry configured to enable the power stage to output power when the output voltage is lower than a reference voltage by one of: a predetermined amount and an adaptive amount, the control circuitry further configured to disable the power stage from providing the output power when the output voltage exceeds the reference voltage by one of: a predetermined amount and an adaptive amount.

18 Claims, 10 Drawing Sheets

(56) References Cited

U.S. PATENT DOCUMENTS

| | | | |
|---|---|---|---|
| 2008/0030178 A1* | 2/2008 | Leonard | H02M 3/156 323/282 |
| 2008/0238392 A1* | 10/2008 | Cheung | H02M 3/1584 323/283 |
| 2010/0213910 A1 | 8/2010 | Chen | |
| 2011/0006744 A1* | 1/2011 | Dearborn | H02M 3/1582 323/282 |
| 2013/0207629 A1 | 8/2013 | Engelhardt | |
| 2013/0229829 A1* | 9/2013 | Zhang | H02M 3/01 363/16 |
| 2014/0253081 A1 | 9/2014 | Duncan et al. | |
| 2015/0042300 A1* | 2/2015 | Peker | H02M 3/156 323/274 |
| 2015/0311795 A1 | 10/2015 | Yang et al. | |
| 2016/0181928 A1* | 6/2016 | Kok | H02M 3/33523 363/21.17 |
| 2019/0004577 A1* | 1/2019 | Laur | H03K 7/08 |
| 2019/0115835 A1* | 4/2019 | Cohen | H02M 3/1588 |
| 2020/0076310 A1* | 3/2020 | Takenaka | H02M 3/158 |
| 2020/0204065 A1* | 6/2020 | Masuda | H02M 1/4225 |
| 2020/0228022 A1* | 7/2020 | Hu | H02M 1/15 |

OTHER PUBLICATIONS

Foreign Communication from a Related Counterpart Application, International Search Report and Written Opinion dated Dec. 16, 2020, International Application No. PCT/SG2020/050569 filed on Oct. 7, 2020.

Foreign Communication from a Related Counterpart Application, Extended European Search Report dated Sep. 28, 2023, European Application No. 20873595.1 filed on Oct. 7, 2020.

* cited by examiner

SWITCHED-MODE POWER MODULE, A CONTROL CIRCUITRY FOR VOLTAGE AND CURRENT REGULATIONS

CROSS-REFERENCE TO RELATED APPLICATIONS

The present application is a filing under 35 U.S.C. 371 as the National Stage of International Application No. PCT/SG2020/050569, filed Oct. 7, 2020, entitled "SWITCHED-MODE POWER MODULE, A CONTROL CIRCUITRY THEREOF AND A POWER SUPPLY," which claims priority to Singapore Application No. SG 10202007684T filed with the Intellectual Property Office of Singapore on Aug. 12, 2020, and also claims priority to Singapore Application No. SG 10201909398 W filed with the Intellectual Property Office of Singapore on Oct. 8, 2019, all of which are incorporated herein by reference in their entirety for all purposes.

FIELD

This invention relates to a switched-mode power module, a control circuitry of the switched-mode power module and a power supply comprising the switched-mode power module.

BACKGROUND

Switched-mode power modules serve to deliver regulated voltage, current and/or power to loads by means of appropriate control methods. There are currently two types of power module control methods. The first is an analog control method, involving sensing output voltage and feeding back an analog control signal to linearly tune the duty-cycle of the power stage. The second is a digital control method, involving sensing output voltage and feeding back a digital control signal to linearly tune the duty-cycle of the power stage. Thus, existing control methods are either analog or digital control methods that linearly regulate the output voltage, current and/or power. For example, in a prior art switched-mode power module as shown in FIG. 1 (prior art), the power stage 11 is controlled linearly by a feedback control signal $V_C$ 14 that is either an analog signal or a digital signal that is a replica of the analog signal. In FIG. 1, power stage 11 charges and discharges output inductor L 12 and outputs output voltage $V_O$ 16 and output current $I_O$ 17. This operation is linearly controlled by feedback 13 control signal $V_C$ 14. Exemplary operational waveforms of the prior art power module can be seen in FIG. 2 (prior art). At constant output voltage, $V_O$ 16, when output current $I_O$ 17 varies, feedback control signal $V_C$ 14 varies linearly according to the output loading condition to adjust output stage 11 and hence also input current $I_{IN}$ 15.

However, existing power module control methods have the following shortcomings. First, power-efficiency of the power module based on existing control methods is substantially lower at low output power when compared to its highest power-efficiency at high output power. For example, power-efficiency of a power module can drop to less than 50% (from its highest power efficiency of over 90%) when its output power is 20% of full power. Second, the existing power module control methods are highly sensitive to the output inductor and capacitor in the power module, from the perspective of operational stability. Consequently, the power module typically requires use of a relatively high-cost, high-quality inductor and capacitor with small tolerance. Third, subsequent to the second shortcoming, the power modules based on the prior-art control methodologies cannot be simply implemented in parallel in a 'hot-plug' fashion. This is because they affect and interact with each other when operating in parallel.

There is thus a need for a power module and method of controlling the power module that can. resolve the aforesaid shortcomings.

SUMMARY

Disclosed is a switched-mode power module and its control circuitry to enable/disable the switched-mode power module to deliver output power accordingly, thereby allowing the switched-back power module to output regulated voltage, current and/or power, and to operate in parallel independently or synchronously. The control circuitry provides instantaneous sensing of output power/voltage/current of the power module and adapts the output impedance of the power stage to be low in order to output power/voltage/current when the instantaneous output power is lower than what is required from the load(s). The control circuitry also adapts the output impedance of the power stage to be high in order to cease output power when the instantaneous output power is higher than what is required from the load(s). In other words, the presently disclosed power module and its control circuitry modules control the instantaneous/average output power, voltage or current by enabling/disabling the power stage.

According to a first aspect, there is provided a control circuitry of a switched-mode power module, the switched-mode power module comprising a power stage configured to receive input power from a power supply and to output power to a load, the output power having an output voltage, the control circuitry configured to enable the power stage to output power when the output voltage is lower than a reference voltage by one of: a predetermined amount and an adaptive amount, the control circuitry further configured to disable the power stage from providing the output power when the output voltage exceeds the reference voltage by one of: a predetermined amount and an adaptive amount.

The control circuitry may enable the power stage by lowering impedance of output of the power stage, and the control circuitry may disable the power stage by raising the impedance of the output of the power stage.

The impedance of the output of the power stage may be lowered by connecting the output of the power stage to one of: ground and a direct current (DC) voltage, and the impedance of the output of the power stage may be raised by disconnecting the output of the power stage from both ground and the direct current (DC) voltage.

The control circuitry may comprise a voltage controller and a current controller, the voltage controller may be configured to output a voltage signal to the current controller, the voltage signal may be in accordance with whether the output voltage is lower than the reference voltage or exceeds the reference voltage by one of: the predetermined amount and the adaptive amount, the voltage signal turns on the current controller when the output voltage falls below the reference voltage by one of: the predetermined amount and the adaptive amount, and the voltage signal turns off the current controller when the output exceeds the reference voltage by one of: the predetermined amount and the adaptive amount.

The voltage controller may on or off the current controller to regulate one of: an effective instantaneous output current and an average output current of the current controller.

The voltage controller may comprise at least one of a voltage amplifier and a voltage comparator, the voltage amplifier may be configured to amplify a difference between the reference voltage and one of: the output voltage and the output voltage after being proportionately downscaled, and to output the amplified difference, and the voltage comparator may be configured to compare the output amplified difference from the voltage amplifier against the reference voltage.

The current controller may comprise a peak current regulator, a valley current regulator and a controller configured to output a controlling signal to the power stage according to three inputs, the first input may comprise a comparison of a peak current of a current sensing signal from the power stage against a reference peak current and a comparison of a valley current of the current sensing signal from the power stage against a reference valley current as determined by the peak current regulator and the valley current regulator respectively, the second input may comprise a zero voltage switching signal from the power stage, and the third input may comprise the voltage signal from the voltage controller.

The current controller may be configured to output one of: a predetermined output average current and an adaptive output average current.

According to a second aspect, there is provided a switched-mode power module comprising: a power stage configured to receive input power from a power supply and to provide an output power to a load; and the control circuitry of the first aspect.

The power stage may comprise one of: a buck converter and a boost converter, wherein when the output voltage is lower than the reference voltage, an output capacitor is charged up through an inductor connected to the power stage, and when the output voltage is higher than the reference voltage, the output capacitor is discharged to the load and the power stage may be disabled from providing output power.

The power stage may comprise a buck-boost converter, wherein when the output voltage is lower than the reference voltage, an output capacitor is charged up through an inductor connected to the power stage, and when the output voltage is higher than the reference voltage, the output capacitor is discharged to a load and the power stage is disabled from providing output power.

The power stage may comprise a bi-directional converter enabling power to be input from either side of the power module and output from either side of the power module.

The switched-mode power module may comprise a coupled inductor connected to the power stage to form an isolated configuration.

The power stage may comprise a primary stage and a secondary stage, and may further comprise a coupled connector connected to the primary stage and the secondary stage to form an isolated configuration.

The switched-mode power module may further comprise a resonant circuit comprising at least an inductor and a capacitor, the resonant circuit provided in the power path to operate switching at resonant frequency.

Reduction of power loss of the switched-mode power module may be achieved by adjustment of at least one of: the peak current regulator, the valley current regulator and an inductor connected to the power stage.

The power stage may comprise power switches provided to enable and disable the power wherein the switching may be at approximately zero current and approximately zero voltage.

Current output of the switched-mode power regulator may be adjustable by selectively enabling and disabling the current controller.

According to a third aspect, there is provided a power supply comprising: the switched-mode power module of the second aspect, wherein the switched mode-power module is supplied with input power from at least one power source, the power stage has at least one output, and the switched mode power module delivers power from the at least one power source to at least one load.

Output of an inductor connected to the power stage of the switched-mode power module may be dependent on the peak current and the valley current that may be regulated by the peak current regulator and the valley current regulator respectively.

Alternatively, the power supply may comprise a plurality of the switched-mode power module of the second aspect connected in parallel to supply output power to at least one load.

The plurality of the switched-mode power modules may be supplied with input power from a number of power sources.

One of the power sources may supply input power to at least two switched-mode power modules of the plurality of the switched-mode power modules.

The plurality of the switched-mode power modules may output power to a plurality of loads via at least one inductor.

Each of the plurality of the switched-mode power modules may be configured to operate independently.

The plurality of the switched-mode power module may be configured to operate synchronously.

At least one switched-mode power module of the plurality of the switched-mode power module may be a redundant module and does not output power during normal operation of the power supply, and the redundant module may output power when another switched-mode power module of the plurality of the switched-mode power modules is one of: not operational and failing to operate.

This summary does not describe an exhaustive list of all aspects of the present invention. It is anticipated that the present invention includes all methods, apparatus and systems that can be practiced from all appropriate combinations and permutations of the various aspects in this summary, as well as that delineated below. Such combinations and permutations may have specific advantages not specially described in this summary.

BRIEF DESCRIPTION OF FIGURES

In order that the invention may be fully understood and readily put into practical effect, there shall now be described by way of non-limitative example only exemplary embodiments of the present invention, the description being with reference to the accompanying illustrative drawings.

DETAILED DESCRIPTION

Figure 1:
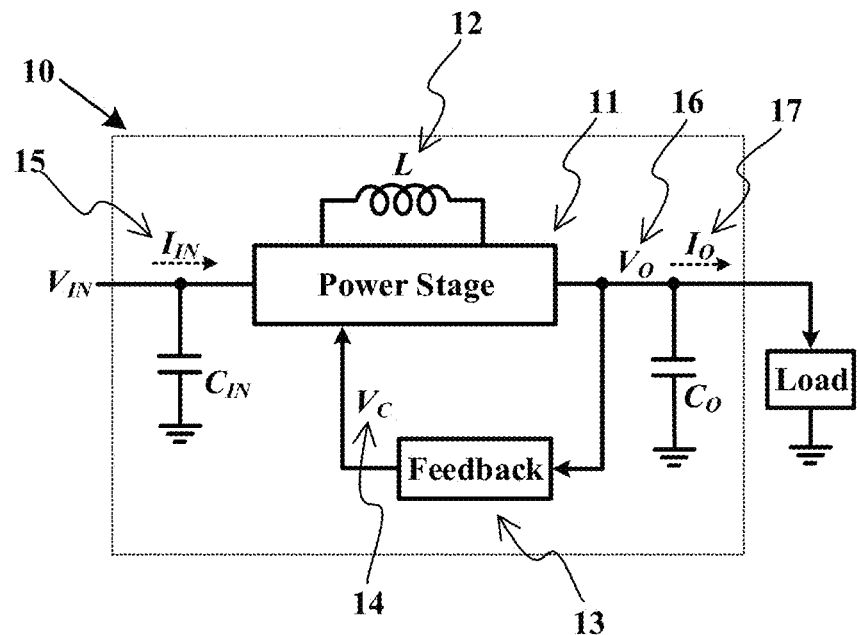
FIG. 1 (prior art) is a block schematic circuit diagram of a first exemplary embodiment of a switched-mode power module.
Figure 2:
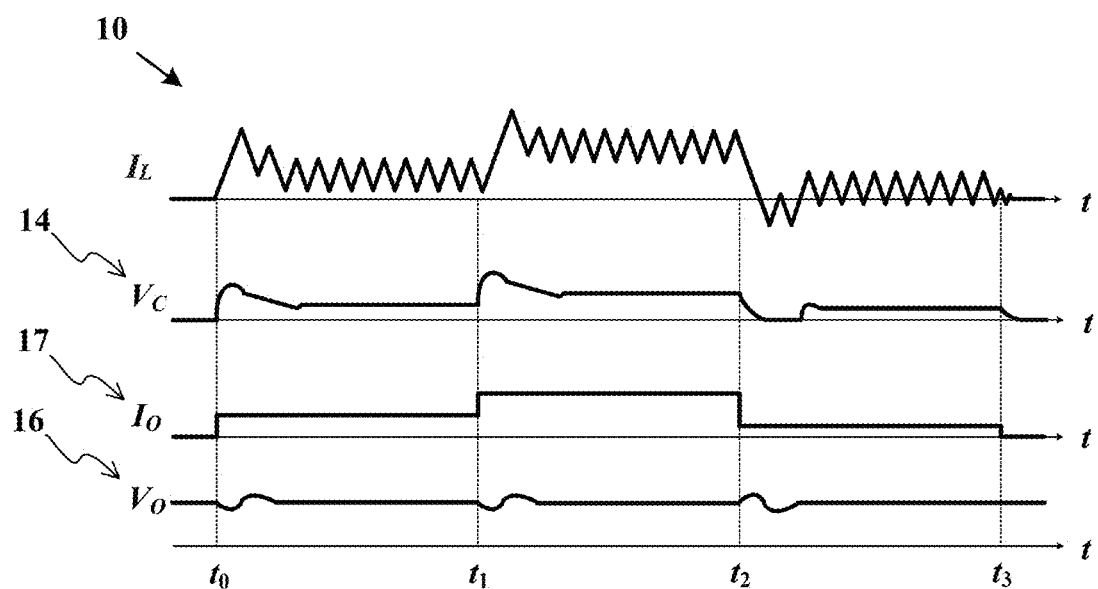
FIG. 2 (prior art) is a graph of exemplary operational waveforms obtained from the power module of FIG. 1.

Exemplary embodiments of a switched-mode power module, a control circuitry of the switched-mode power module and a power supply comprising the switched-mode power module will be described below with reference to FIGS. 3 to 17 below. Numerous specific details are set forth in the following description. It is however understood that embodiments of the invention may be practiced with or without these specific details. In other instances, circuits, structures, methods and techniques that are known do not avoid obscuring the understanding of this description. Furthermore, the following embodiments of the invention may be described as a process, which may be described as a flowchart, a flow diagram, a structure diagram, or a block diagram. The operations in the flowchart, flow diagram, structure diagram or block diagram may be a sequential process, parallel or concurrent process, and the order of the operations may be re-arranged. A process may correspond to a technique, methodology, procedure, etc.

The presently disclosed switched-mode power module comprises at least one power stage and control circuitry for current control and voltage control. Non-linear control is achieved by either enabling output by the power stage or disabling output by the power stage instead of using linear control means in prior-art power modules. The control circuitry is configured to the enable and disable the switched-mode power module to deliver output power when an output voltage of the power stage is lower than a reference voltage by a predetermined amount or an adaptive amount and when the output voltage of the power stage exceeds the reference voltage by a predetermined amount or an adaptive amount respectively.

Control of the 'enable' and 'disable' operations above may involves two parts. The first part may be performed by a current controller comprising a peak current regulator and a valley current regulator. The second part may be performed by a voltage controller that regulates the output voltage of the power stage by enabling/disabling the current controller and other blocks of the power module accordingly. In other words, the control circuitry of the switched-mode power modules thus controls the instantaneous/average output power, voltage or current by enabling/disabling the power stage.

Consequent to the 'enable' and 'disable' operations provided by the presently disclosed switched mode power module and its control circuitry, three significant advantages are obtained:

(a) the switched-mode power module always operates at its highest power-efficiency at a predetermined duty cycle when it is enabled;

(b) the switched-mode power module is inherently stable since the control provided by the control circuitry is non-linear, thus the accuracy requirement for the discrete output inductor and capacitor is substantially relaxed; and (c) each switched-mode power module is allowed to independently operate in parallel, hence providing the 'hot-plug' feature.

Various embodiments of the switched-mode power module and its control circuitry to control the instantaneous output power, voltage or current by enabling/disabling the power stage will be described below, and may include the switched-mode power module featuring one or more of the following:

delivering power through one or more outputs with one or more inductor(s);
having one or more coupled inductor(s);
having a lower input voltage and a higher output voltage;
having a higher input voltage and a lower output voltage;
having inter-changeable input and output;
having an isolated or non-isolated output;
operating at constant average output power;
being inherently stable by enabling or disabling the power stage to provide output power;
being fully soft-switching; and
delivering power through a resonant circuit that embodies one or more inductors and capacitors.

A power supply comprising a plurality of units of the presently disclosed switched-mode power module may be connected in parallel and operated independently to:

deliver higher output power;
deliver power to one or more outputs with one or more inductor(s);
provide a means for redundancy;
provide power through a resonant circuit comprising inductors and capacitors;
provide for lower input voltage and a higher output voltage;
provide for higher input voltage and a lower output voltage;
provide for either a lower input voltage and a higher output voltage or a higher input voltage and a lower output voltage;
operate at constant average output power;
be inherently stable;
be fully soft-switching; and
operate with one or more coupled inductor(s), wherein each power module is either a power input or a power output.

Figure 3:
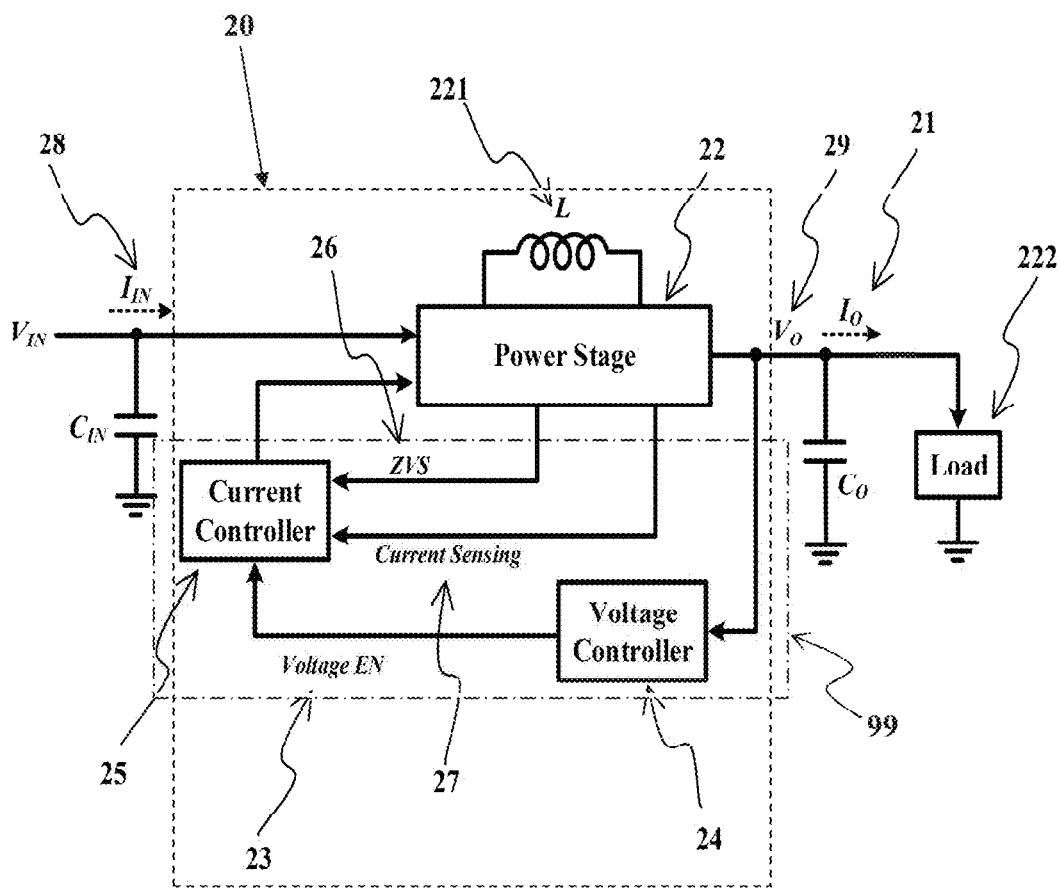
FIG. 3 is a block schematic circuit diagram of a first exemplary embodiment of a switched-mode power module.

A first exemplary embodiment of the switched-mode power module 20 as shown in FIG. 3 comprises a power stage 22 and control circuitry 99 comprising a voltage controller 24 and a current controller 25. The power stage 22 may comprise power switches that are switched on or off to enable or disable the power stage 22 from providing output power respectively, wherein the switching is at approximately zero current and approximately zero voltage. The power stage 22 charges and discharges an output voltage $V_O$ 29 through an inductor L 221 and this operation is controlled nonlinearly by an output voltage signal EN 23 of the voltage controller 24 that enables or disables the current controller 25 that in turn enables or disables the power stage 22 respectively. The speed of charging and discharging is regulated by the current controller 25 via a current sensing signal 27 and a Zero Voltage Switching (ZVS) signal 26 from the power stage 22. The control circuitry 99 is adapted to all types of switched-mode power modules, including step-up, step-down, step-up/step-down, and bi-directional power modules, as will be described in greater detail below.

Figure 4:
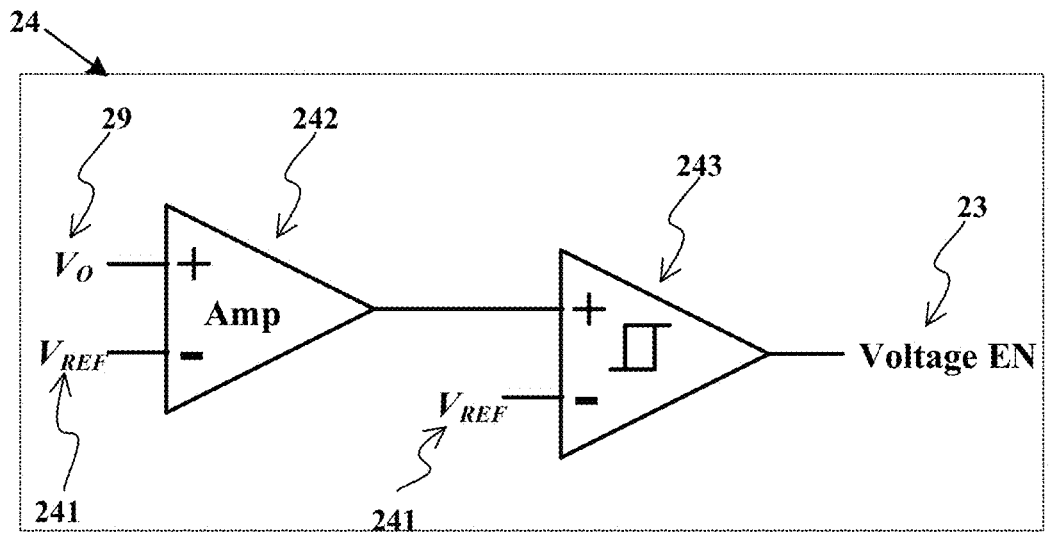
FIG. 4 is a block schematic circuit diagram of an exemplary embodiment of a voltage controller of a control circuitry.

FIG. 4 shows an exemplary embodiment of the voltage controller 24 in the control circuitry 99. The voltage controller 24 comprises a voltage amplifier 242 and a comparator 243. The voltage amplifier 242 may be an error amplifier and is configured to amplify the difference between the output voltage $V_O$ 29 of the power stage 22 and a reference voltage $V_{REF}$ 241 and to output the amplified difference. Alternatively, the difference that is amplified by the voltage amplifier 242 may be between the reference voltage $V_{REF}$ 241 and the output voltage $V_O$ 29 after it has been proportionately downscaled. The reference voltage $V_{REF}$ 241 can be generated by a bandgap voltage reference. The comparator 243 may be a hysteresis comparator and is configured to compare the output amplified difference from the voltage amplifier against the reference voltage $V_{REF}$ 241, and to output the voltage signal EN 23 to turn on/off the current controller 25. When the output voltage $V_O$ 29 falls below the reference voltage $V_{REF}$ 241 by a predetermined amount or an adaptive amount, the voltage EN signal 23 is set to 'high' by the comparator 243 which turns on or enables the current controller 25, thereby enabling output by the power stage 22 to deliver power to a load 222. When the output voltage $V_O$ 29 exceeds the reference voltage $V_{REF}$ 241 by a predetermined amount or an adaptive amount, the voltage signal EN 23 is set to 'low' by the comparator 243 which turns off or disables the current controller 25, thereby disabling output by the power stage 22 such that the load 222 draws power from an output capacitor $C_O$. In alternative embodiments, the voltage controller 24 may comprise only the voltage amplifier 242 or only the comparator 243 that may each be configured to output the voltage signal EN 23 for enabling or disabling the current controller 25 and thereby enabling or disabling output by the power stage 22 respectively.

Figure 5:
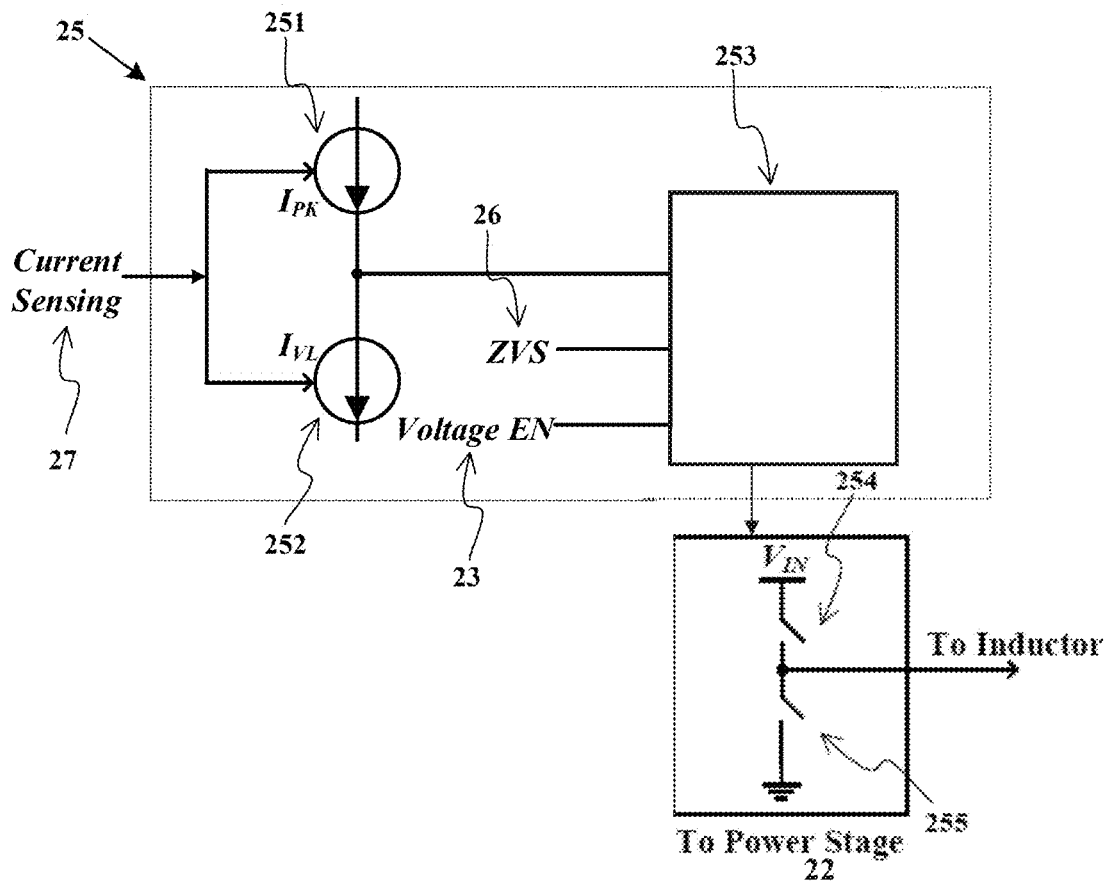
FIG. 5 is a block schematic circuit diagram of an exemplary embodiment of a current controller of a control circuitry.

FIG. 5 shows an exemplary embodiment of the current controller 25 in the control circuitry 99 with an exemplary configuration of the power stage 22, noting that many other configurations are possible for the power stage 22. The current controller 25 comprises a peak current regulator 251, a valley current regulator 252 and a control unit 253 that outputs controlling pulses or signals to the power stage 22 based on three inputs. The first input 277 is a comparison of the peak current $I_{PK}$ and the valley current $I_{VL}$ of the current sensing signal 27 against a reference peak current and a reference valley current as determined by the peak current regulator 251 and the valley current regulator 252 respectively. The second input signal is the ZVS signal 26. The third signal is the voltage EN signal 26. When the sensed peak current $I_{PK}$ exceeds the reference peak current, the comparison output forces the control unit 253 to output a 'high' signal to first turn off a topside switch (not shown) in the power stage 22 and subsequently turns on a downside switch (not shown) in power stage 22 based on the second input signal, ZVS signal 26. When valley current $I_{VL}$ decreases below the reference valley current, the comparison output forces the control unit 253 to output a 'low' signal to first turn off the downside switch in power stage 22 and subsequently turn on the topside switch in the power stage 22 based on the ZVS signal 26. The third input signal, voltage signal EN 23, provides the global control of the operation by enabling or disabling the current controller 25 as described above with reference to FIG. 4. The current controller 25 thus senses the instantaneous output current $I_O$ 21 of the power stage 22. When the output current $I_O$ 21 reaches the peak reference current $I_{PK}$, the current controller 25 turns off the topside switch and turns on the downside switch of power stage 22, and the output current $I_O$ 21 starts to decrease. When the (inductor) output current $I_O$ 21 reaches the valley reference current $I_{VL}$, the current controller 25 turns off the downside switch of the power stage 22 and turns on the topside switch of power stage 22, and the (inductor) output current $I_O$ 21 starts to increase. The timing of turning on/off both the topside and downside switches in power stage 22 is determined by both the current sensing signal 27 and the ZVS signal 26. In this way, fully-soft switching is achieved.

The reference peak current can be adaptive according to (inductor) output current $I_O$ 21 of the power stage 22. Specifically, when the output current 21 is low, the reference peak current is lower, and hence peak current $I_{PK}$ is lower. When the output current $I_O$ 21 is high, the reference peak current is higher, and hence peak current $I_{PK}$ is higher. An effect inductor (not shown) connected to the switched-mode power module 20 is dependent on the peak current $I_{PK}$ and the valley current $I_{VL}$.

The global control by means of voltage signal EN 23 can also be controlled as a constant duty cycle. In this way, the output current $I_O$ 21 21 is a constant current—akin to a constant current source.

The control circuitry enables sensing of the instantaneous output power/voltage/current, so as to adapt the output impedance of the power stage to be low and/or provide a power path to the power stage in order to output power/voltage/current when the instantaneous output power is lower than what is required from a load, and to adapt the output impedance of the power stage to be high and/or remove a power path to the power stage to cease output power when the instantaneous output power is higher than what is required from the load. In exemplary embodiments, adaption to low impedance is achieved by connecting the output of the power stage to ground or to a DC voltage, wherein the connection is achieved by turning on the power switch 254 or the power switch 255 on the power path. Adaption to high impedance is achieved by disconnecting the output of the power stage 22 from ground or from a DC voltage, wherein the disconnection is achieved by turning off the power switch(es) 254 255 on the power path—akin to turning off a switch.

One example of the said current controller 25 includes the two current regulators 251, 252 and the current control unit 253. The two current regulators 251, 252 respectively sense the current through the power switch 254 that conducts the current from the DC power supplies and the current through the power switch 255 that conduct to ground. The current controller 25 determines the on/off of the pertinent power switches 254, 255 based on the output of the two current regulators. Specifically, when the current flowing from the DC power supplies to output increases to $I_{pk}$, the power switch 254 on this power path is turned off, and the power switch 255 on the power path from ground to output is turn on. Subsequently, when the current flowing from ground to output decreases to $I_{VL}$, the power switch 255 on this power path is turned off, and the power switch 254 on the power path from the DC power supplies to output is turned on. The operation continues until voltage EN 23 is '1', hence disconnecting both power switch 254, 255 on the two power paths.

Figure 6:
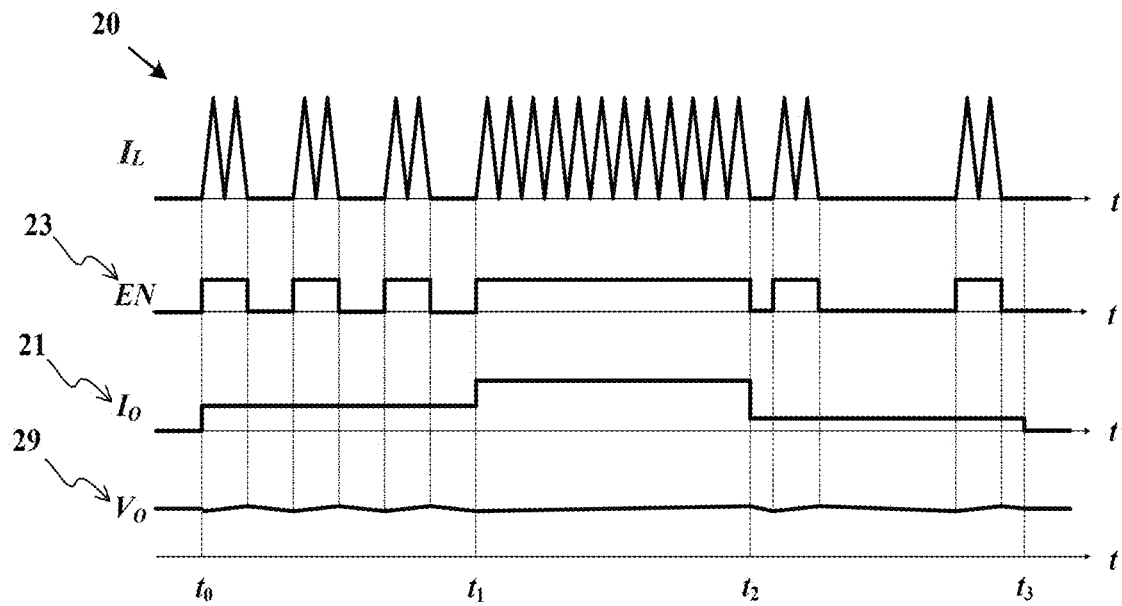
FIG. 6 is a graph of exemplary operational waveforms of the power module of FIG. 3.

Waveforms from the first exemplary embodiment of the switched-mode power module 20 can be seen in FIG. 6. When voltage EN 23 is '0', the inductor current, $I_L$, is 0 and the output of the power stage exhibits a high impedance by disconnecting the power paths from the DC power supplies to output and that from ground to output. When voltage EN 23 is '1', the inductor current, $I_L$, is regulated by the two current regulators in FIG. 5, as described above.

At a constant output voltage $V_O$ 29, when output current $I_O$ 21 varies, the voltage signal EN 23 varies nonlinearly according to the output loading condition to adjust the output of the power stage 22. Specifically, when output current $I_O$ 21 increases, the power stage 22 operates for a longer time to deliver more power to the load. When the output current $I_O$ 21 decreases, the power stage 22 operates for shorter time to deliver less power to the load 222.

The switched-mode power module 20 can thus be viewed as an inherently stable constant current source that operates at its maximum power efficiency as the voltage signal EN 23 enables operation of the switched-mode power module 20 to output power only when instantaneous power is insufficient. Furthermore, the switched-mode power module 20 operates with fully soft-switching, and the control circuitry is applicable to both low-power and high-power power stages 22. Different configurations of the exemplary first embodiment of the switched-mode power module 20 may be provided, based on the type of inductors (e.g., un-coupled inductor, coupled inductor or resonant tank) used, and will be described in greater detail below.

Figure 7:
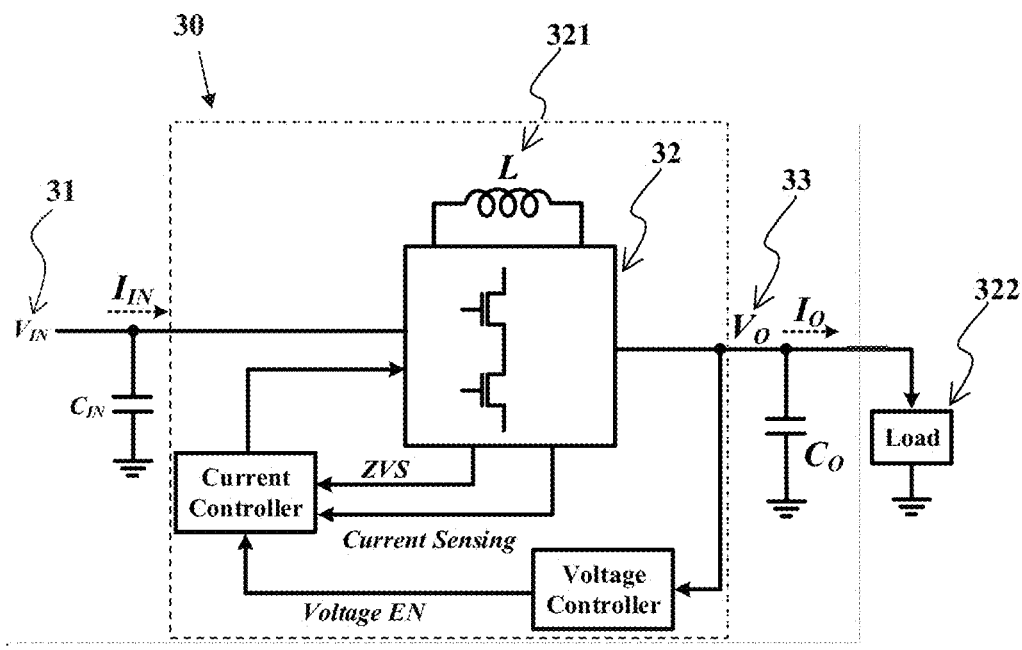
FIG. 7 is a block schematic circuit diagram of a first variation of the power module of FIG. 3 comprising a buck or boost converter.

As shown in FIG. 7, a first variation of the first exemplary embodiment of the switched-mode power module 30 comprises either a buck converter or a boost converter in the power stage 22, for use when the input voltage $V_{IN}$ 31 is higher than the output voltage $V_O$ 33 or when the input voltage $V_{IN}$ 31 is lower than the output voltage $V_O$ 33 respectively. When the output voltage $V_O$ 33 is lower than the reference voltage (not shown) as determined by the voltage controller, the output capacitor $C_O$ is charged up through an inductor L 321 connected to the power stage 32. When the output voltage $V_O$ 33 is higher than the reference voltage (not shown) as determined by the voltage controller, output capacitor $C_O$ is discharged to load 322 and the power stage 32 is disabled from providing output power.

Figure 8:
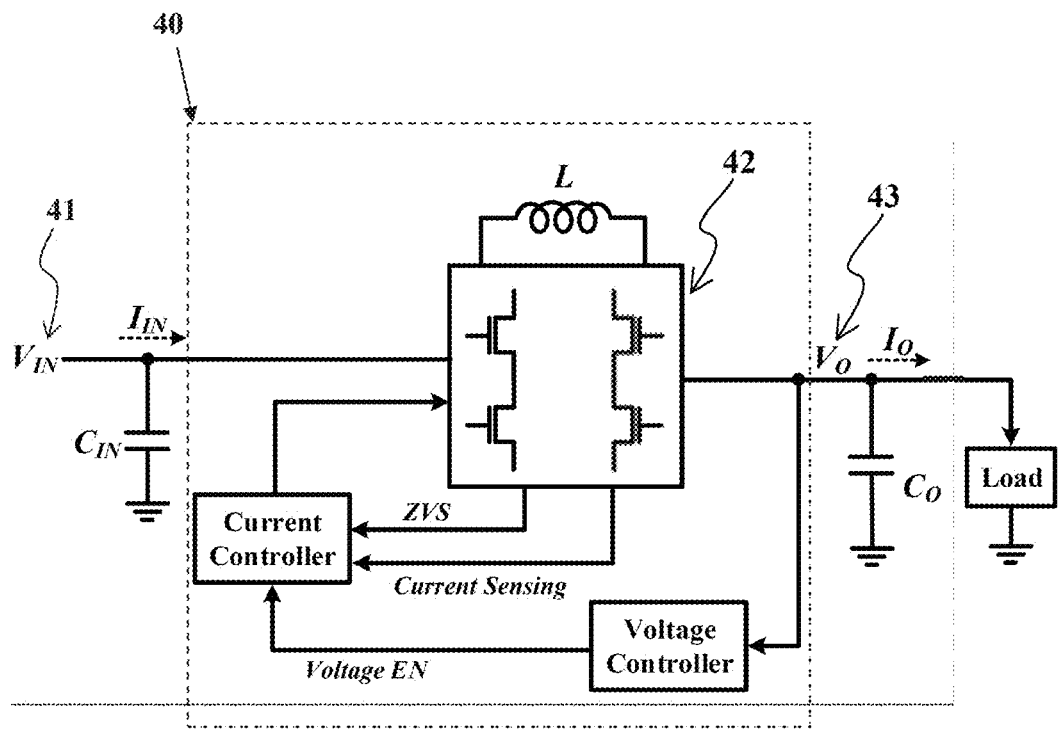
FIG. 8 is a block schematic circuit diagram of a second variation of the power module of FIG. 3 comprising a buck-boost converter.

FIG. 8 depicts a second variation of the first exemplary embodiment of the switched-mode power module 40 comprising a buck-boost converter in the power stage 22 that may be used whether the input voltage $V_{IN}$ 41 is higher or lower than the output voltage $V_O$ 43. When the output voltage $V_O$ 43 is lower than the reference voltage (not shown) as determined by the voltage controller, the output capacitor $C_O$ is charged up through an inductor L connected to the power stage 42. Conversely, when the output voltage $V_O$ 43 is higher than the reference voltage (not shown) as determined by the voltage controller, the output capacitor $C_O$ is discharged to load 322, and the power stage 42 is disabled from providing output power.

Figure 9:
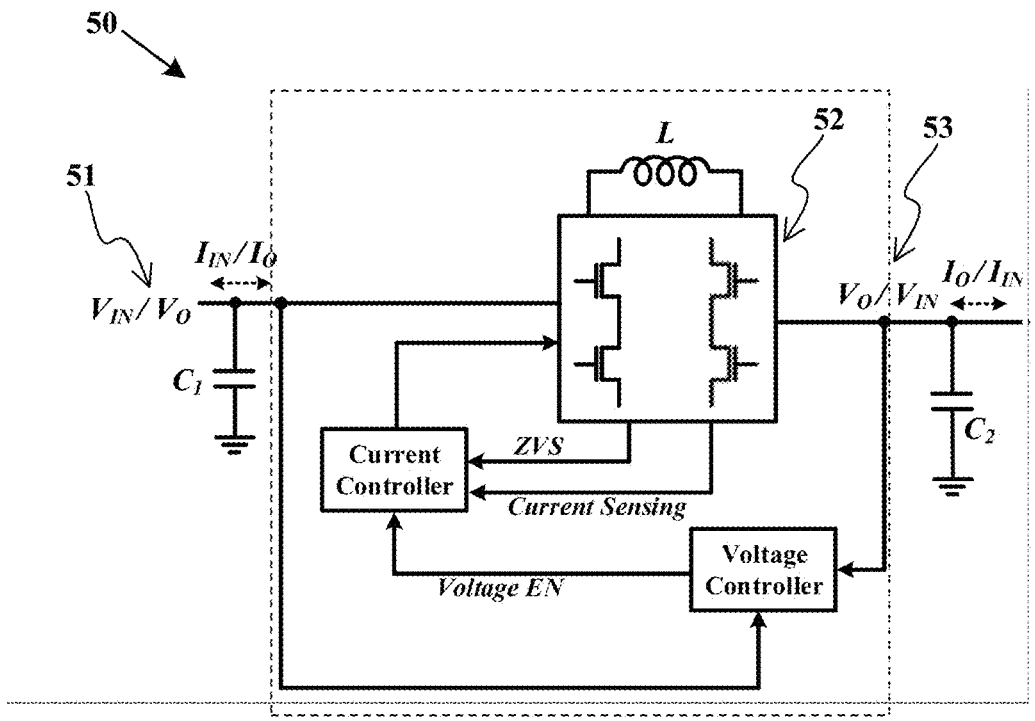
FIG. 9 is a block schematic circuit diagram of a third variation of the power module of FIG. 3 comprising a bi-directional converter.

A third variation of the first exemplary embodiment of the switched-mode power module 50 is shown in FIG. 9 that comprises a bi-directional converter in the power stage 22, for use where voltage $V_{IN}/V_O$ 51 or $V_O/V_{IN}$ 53 may be input/output from either side of the power module 50.

Figure 10:
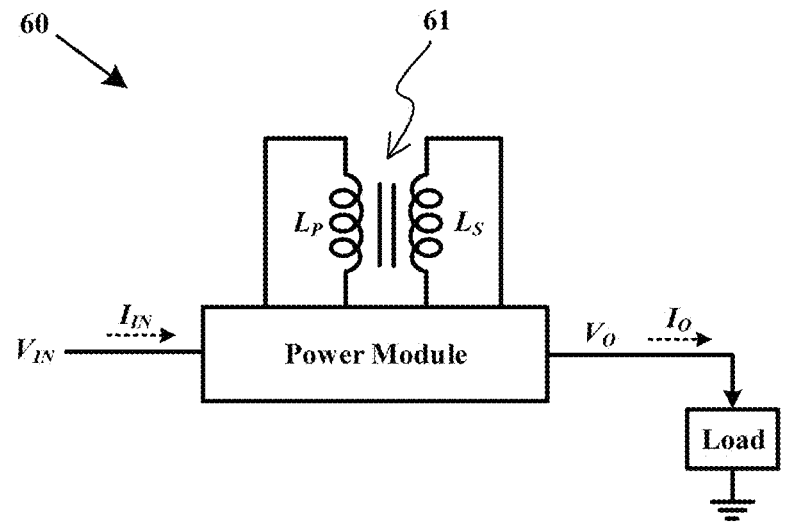
FIG. 10 is a block schematic circuit diagram of a fourth variation of the power module of FIG. 3 comprising a coupled inductor.

In a fourth variation of the first exemplary embodiment of the switched-mode power module 60 as shown in FIG. 10, a coupled inductor 61 is implemented to form a non-isolated configuration.

Figure 11:
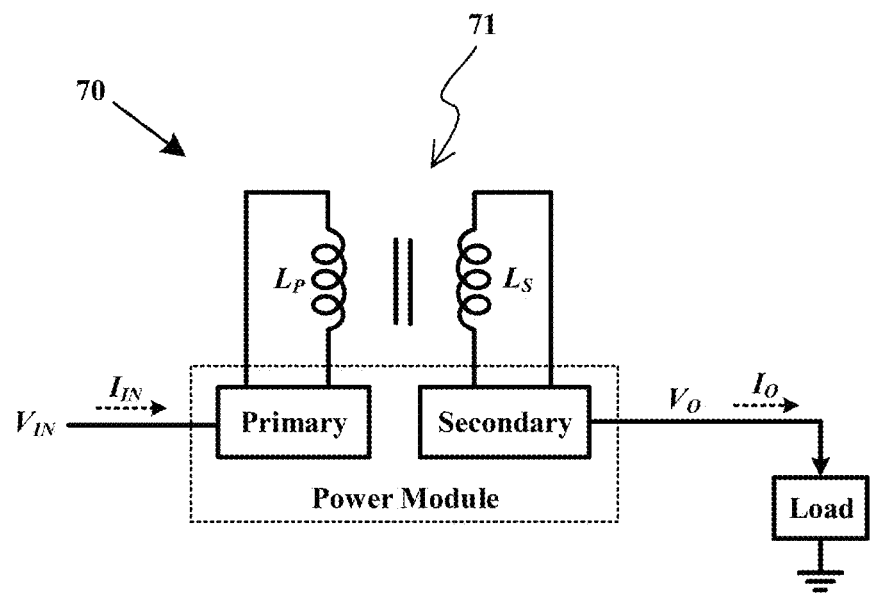
FIG. 11 is a block schematic circuit diagram of an alternative variation of the power module of FIG. 10.

FIG. 11 shows a fifth variation of the first exemplary embodiment of the switched-mode power module 70 where a coupled inductor 71 is implemented to form an isolated configuration. In the primary side, the primary inductor $L_P$ is first energized by the switched-mode power module. Subsequently, the secondary inductor $L_S$ is next energized by means of coupling, and thus outputs an appropriate voltage $V_o$.

Figure 12:
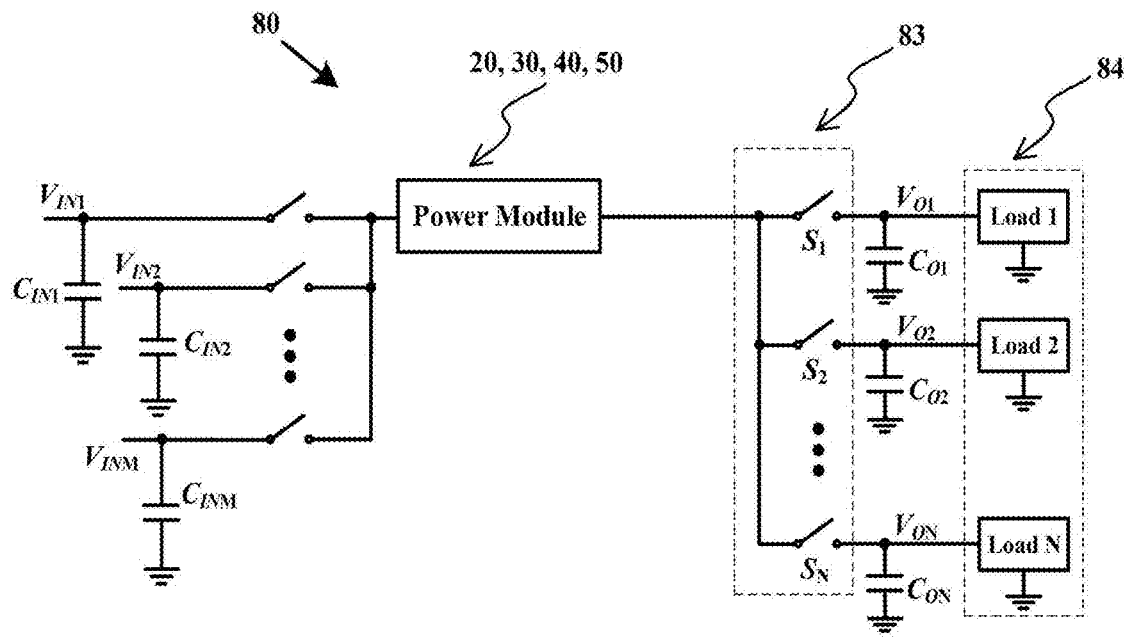
FIG. 12 is a block schematic circuit diagram of a first exemplary power supply comprising one of the switched-mode power modules of FIGS. 3, 7, 8 and 9.

In FIG. 12, a first exemplary power supply 80 comprising any one of the variations of the first exemplary embodiment of the switched-mode power module 20, 30, 40, 50. In this power supply 80, a single unit of the switched-mode power module 20, 30, 40, 50 with a single inductor (or a coupled inductor) is arranged to receive one or more inputs and to provide one or more outputs via an array of a number of switches 83 in order to deliver power to a corresponding number of loads 84. In this configuration, each output can exhibit a different output voltage at a different output current.

Figure 13:
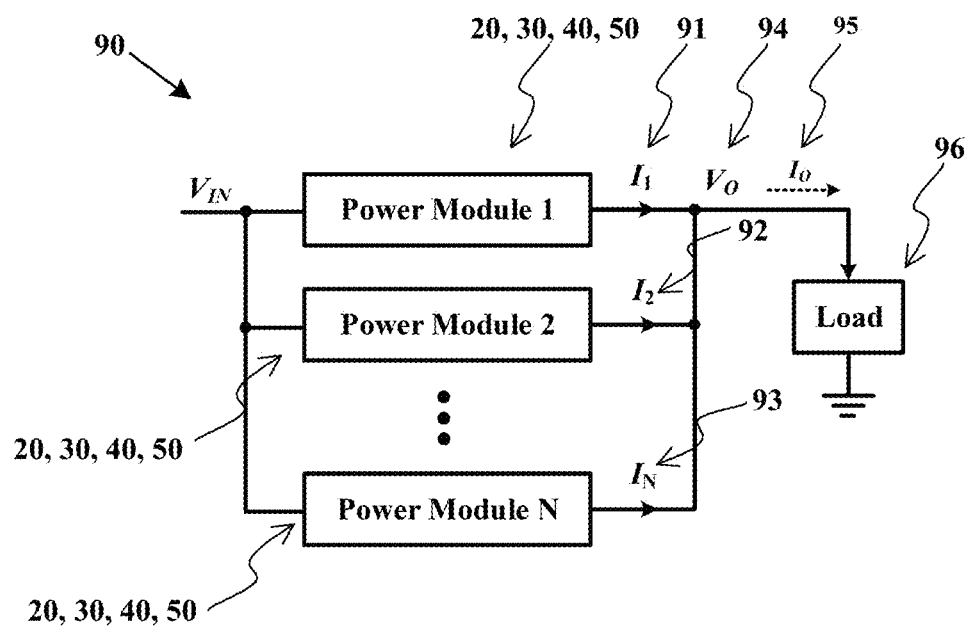
FIG. 13 is a block schematic circuit diagram of a second exemplary power supply comprising a plurality of any of the switched-mode power modules of FIGS. 3, 7, 8 and 9.

FIG. 13 depicts a second exemplary power supply 90 comprising a plurality (power module 1-N) of any the switched-mode power modules 20, 30, 40, 50 of FIGS. 3, 7, 8 and 9. The plurality of switched-mode power modules 1-N are connected in parallel to deliver higher power independently or synchronously from one input to one load 96. This power supply 90 allows two unique features—'hot redundancy' and 'hot-plug'. In 'hot redundancy', more than the required number of power modules are provided in parallel such that some of them serve as redundant power modules to provide for redundancy. When one or more operational power modules fail, the redundant power modules are immediately and automatically activated to electrically replace any failed power modules. No central control required for the 'hot-redundancy' feature. Subsequent to failure of some power modules, these failed power modules can be unplugged and physically replaced by new power modules while the entire the switched-mode power module 90 is still operating, thus providing 'hot-plug' functionality. This power supply 90 also allows each of the plurality of power modules 1-N to operate independently or synchronously. When operating independently, each of the plurality of power modules 1-N regulates itself without affecting the other power modules. When operating synchronously, all the power modules 1-N are synchronized at a same or similar switching frequency.

Figure 14:
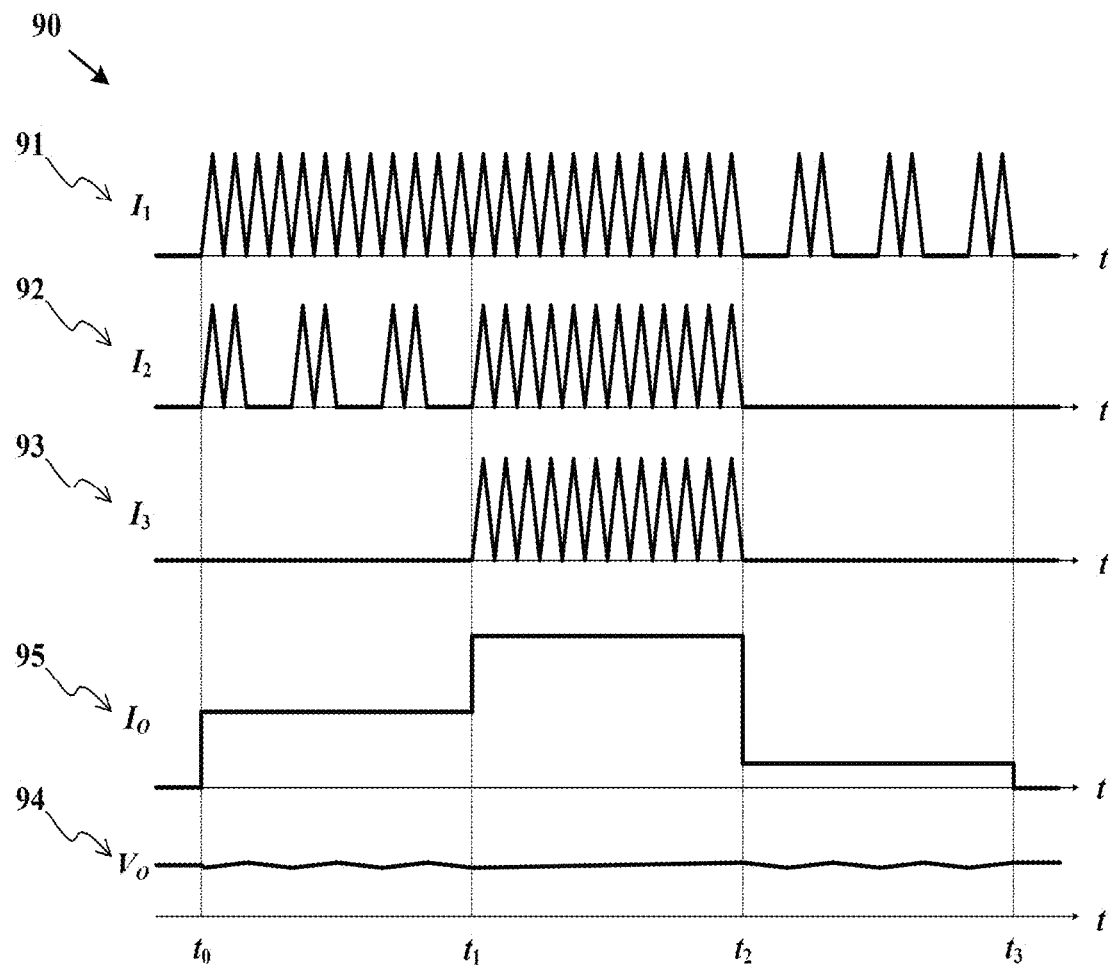
FIG. 14 is a graph of exemplary operational waveforms of the power supply of FIG. 13.

Waveforms from the second exemplary power supply 90 comprising a plurality of the switched-mode power modules 1-N depicted in FIG. 13 can be seen in FIG. 14 where the power supply 90 comprises three power modules provided in parallel. At a constant output voltage 94, when the output current 95 is medium between time $t_0$-$t_1$, only the first and second power modules are operating and the third power module is disabled. During this time, the first power module delivers its maximum output current $I_1$ 91 and the second power module delivers its output current $I_2$ 92 according to the load. When the total output current $I_O$ 95 is high between $t_1$-$t_2$, all three power modules operate and deliver their maximum output currents $I_1$ 91, $I_2$ 92, $I_3$ 93, respectively. When the overall output current 95 is low between $t_2$-$t_3$, only the first power module operates and delivers its output current $I_1$ 91 according to the load while the second and third power modules are disabled.

Figure 15:
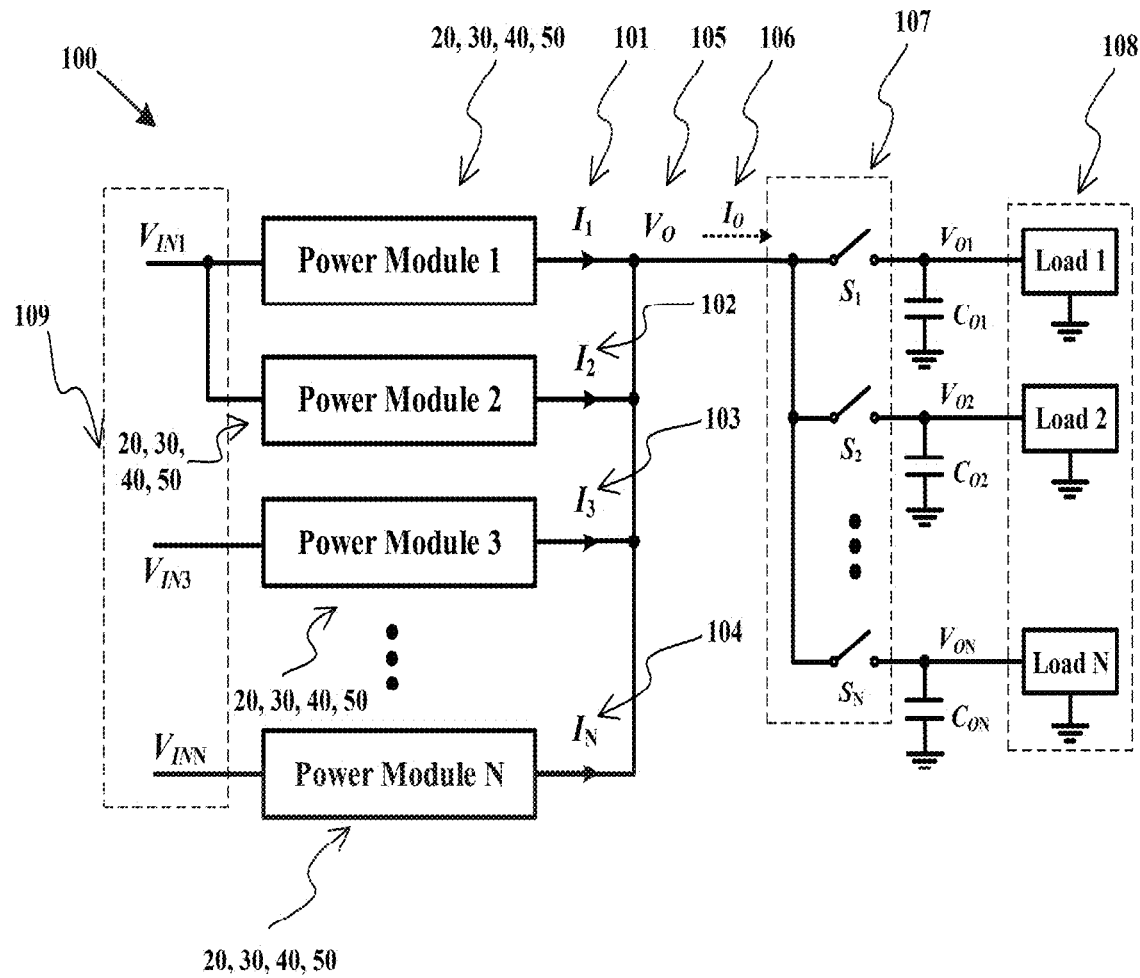
FIG. 15 is a block schematic circuit diagram of a third exemplary power supply comprising a plurality of any of the switched-mode power modules of FIGS. 3, 7, 8 and 9.

FIG. 15 depicts a third exemplary power supply 100 comprising a plurality (power module 1-N) of any the switched-mode power modules 20, 30, 40, 50 of FIGS. 3, 7, 8 and 9. The plurality of switched-mode power modules 1-N are connected in parallel to deliver higher power independently or synchronously from a number of inputs 109 via an array of a corresponding number of switches 107 to a corresponding number of loads 108. Output currents $I_1$ 101, $I_2$ 102, $I_3$ 103, and $I_4$ 104 from the power modules 1-N respectively can be the same as or different from each other. The total output voltage $V_O$ 105 and total output current $I_O$ 106 will vary according to the loads 108.

Figure 16:
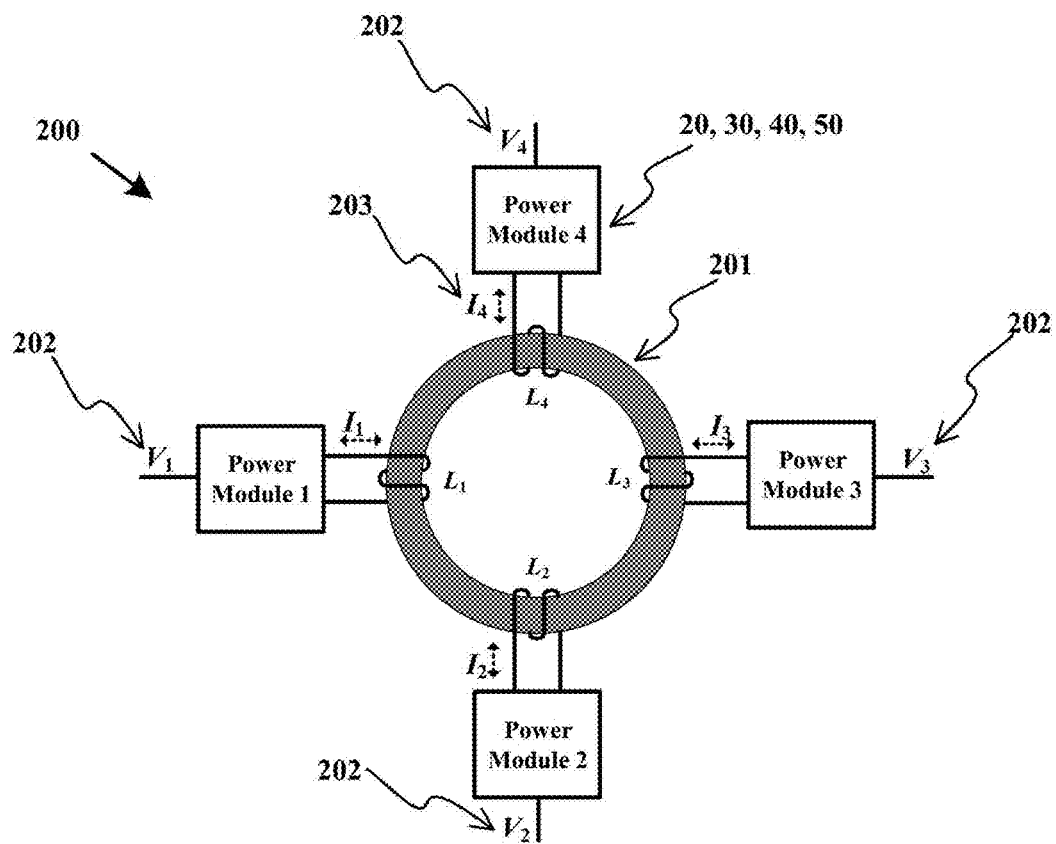
FIG. 16 is a block schematic circuit diagram of a fourth exemplary power supply comprising a plurality of any the switched-mode power modules of FIGS. 3, 7, 8 and 9.

FIG. 16 depicts a fourth exemplary power supply 200 comprising a plurality (power module 1-4) of any of the switched-mode power modules 20, 30, 40, 50 of FIGS. 3, 7, 8 and 9. The plurality of power modules 1-4 are interconnected via one or more coupled inductors 201, 202, 203, 204. Each voltage node $V_1$-$V_4$ 202 can be either an input or an output, and the respective currents $I_1$-$I_4$ 203 are bi-directional, such that each power module 1-4 serves as either power input or power output.

Figure 17:
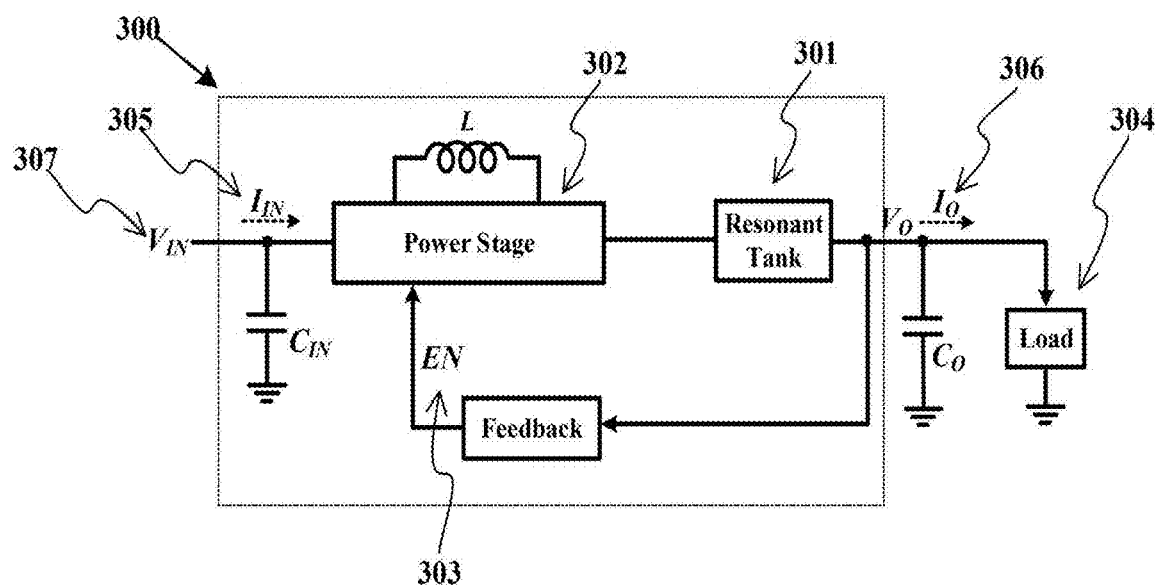
FIG. 17 is a block schematic circuit diagram of a second exemplary embodiment of a switched-mode power module.

FIG. 17 depicts a second exemplary embodiment of a switched-mode power module 300 arranged to deliver power to multiple outputs through a resonant tank or circuit 301. The resonant tank or circuit 301 comprises at least an inductor (not shown) and a capacitor (not shown), and is provided in the power path in order to operate the switching at the resonant frequency.

Whilst there has been described in the foregoing description exemplary embodiments of the present invention, it will be understood by those skilled in the technology concerned that many variations and combination in details of design, construction and/or operation may be made without departing from the present invention.

The invention claimed is:

1. A control circuitry of a switched-mode power module, the switched-mode power module comprising a power stage that includes a plurality of components and is configured to receive an input power from a direct current (DC) power supply and to output an output power to a load,
    wherein the plurality of components comprises at least two power switches,
    wherein the output power has an output voltage,
    wherein the control circuitry is configured to enable the power stage to output the output power when the output voltage is lower than a reference voltage by one of: a predetermined amount and an adaptive amount,
    wherein the control circuitry is further configured to disable the power stage from providing the output power when the output voltage exceeds the reference voltage by one of: another predetermined amount and another adaptive amount,
    wherein the control circuitry comprises a voltage controller and a current controller,
    wherein the voltage controller is configured to output a voltage signal to the current controller,
    wherein the current controller comprises a peak current regulator, a valley current regulator and a controller configured to output a controlling signal to the power stage according to a first input, a second input, and a third input,
    wherein the first input comprises a comparison of a peak current of a current sensing signal from the power stage against a reference peak current and a comparison of a valley current of the current sensing signal from the power stage against a reference valley current as determined by the peak current regulator and the valley current regulator respectively,
    wherein the second input comprises a zero voltage switching signal from the power stage, and
    wherein the third input comprises the voltage signal from the voltage controller.

2. The control circuitry of claim 1, wherein the control circuitry enables the power stage by lowering an impedance of an output of the power stage, and wherein the control circuitry disables the power stage by raising the impedance of the output of the power stage.

3. The control circuitry of claim 2, wherein the impedance of the output of the power stage is lowered by connecting the output of the power stage to one of: ground and a direct current (DC) voltage, and wherein the impedance of the output of the power stage is raised by disconnecting the output of the power stage from both ground and the direct current (DC) voltage.

4. The control circuitry of claim 1, wherein the voltage signal is in accordance with whether the output voltage is lower than the reference voltage by one of: the predetermined amount and the adaptive amount, or exceeds the reference voltage by one of: the another predetermined amount and the another adaptive amount, wherein the voltage signal turns on the current controller when the output voltage falls below the reference voltage by one of: the predetermined amount and the adaptive amount, and wherein the voltage signal turns off the current controller when the output exceeds the reference voltage by one of: the another predetermined amount and the another adaptive amount.

5. The control circuitry of claim 4, wherein the voltage controller turns on or off the current controller to regulate one of: an effective instantaneous output current and an average output current of the current controller.

6. The control circuitry of claim 1, wherein the voltage controller comprises at least one of a voltage amplifier and a voltage comparator, wherein the voltage amplifier is configured to amplify a difference between the reference voltage and one of: the output voltage and the output voltage after being proportionately downscaled, and to output the amplified difference, and wherein the voltage comparator is configured to compare the output amplified difference from the voltage amplifier against the reference voltage.

7. The control circuitry of claim 1, wherein the current controller is configured to output one of: a predetermined output average current and an adaptive output average current.

8. The switched-mode power module of claim 1, wherein the power stage comprises one of: a buck converter, a boost converter and a buck-boost converter, wherein when the output voltage is lower than the reference voltage, an output capacitor is charged up through an inductor connected to the power stage, and when the output voltage is higher than the reference voltage, the output capacitor is discharged to the load and the power stage is disabled from providing output power.

9. The switched-mode power module of claim 1, wherein the power stage comprises a bi-directional converter enabling power to be input from either side of the power module and output from either side of the power module.

10. The switched-mode power module of claim 1, comprising a coupled inductor connected to the power stage to form an isolated configuration.

11. The switched-mode power module of claim 1, wherein the power stage comprises a primary stage and a secondary stage, and further comprising a coupled connector connected to the primary stage and the secondary stage to form an isolated configuration.

12. The switched-mode power module of claim 1, further comprising a resonant circuit comprising at least an inductor and a capacitor, the resonant circuit provided in the power path to operate switching at resonant frequency.

13. The switched-mode power module of claim 1, wherein the current controller comprises a peak current regulator, a valley current regulator and a controller configured to output a controlling signal to the power stage according to three inputs, wherein the first input comprises a comparison of a peak current of a current sensing signal from the power stage against a reference peak current and a comparison of a valley current of the current sensing signal from the power stage against a reference valley current as determined by the peak current regulator and the valley current regulator respectively, wherein the second input comprises a zero voltage switching signal from the power stage, wherein the third input comprises the voltage signal from the voltage controller, and wherein reduction of power loss of the switched-mode power module is achieved by adjustment of at least one of: the peak current regulator, the valley current regulator and an inductor connected to the power stage.

14. The switched-mode power module of claim 1, wherein the power stage comprises power switches provided to enable and disable the input power from any of input power sources wherein the switching is at approximately zero current and approximately zero voltage.

15. The switched-mode power module of claim 1, wherein a current output of the switched-mode power module is adjustable by selectively enabling and disabling the current controller.

16. A power supply comprising:
the switched-mode power module of claim 1, wherein the switched-mode power module is supplied with the input power from at least one power source, wherein the power stage has at least one output, and wherein the switched-mode power module outputs the output power from the at least one input power source to at least one load.

17. The power supply of claim 16, wherein the current controller comprises a peak current regulator, a valley current regulator and a controller configured to output a controlling signal to the power stage according to three inputs, wherein the first input comprises a comparison of a peak current of a current sensing signal from the power stage against a reference peak current and a comparison of a valley current of the current sensing signal from the power stage against a reference valley current as determined by the peak current regulator and the valley current regulator respectively, wherein the second input comprises a zero voltage switching signal from the power stage, wherein the third input comprises the voltage signal from the voltage controller, and wherein an output of an inductor connected to the power stage of the switched-mode power module is dependent on the peak current and the valley current that are regulated by the peak current regulator and the valley current regulator respectively.

18. An overall power supply comprising:
a plurality of the switched-mode power module of claim 1 connected in parallel to supply the output power to at least one load.

* * * * *